US012362447B2

(12) United States Patent
Zhang et al.

(10) Patent No.: US 12,362,447 B2
(45) Date of Patent: Jul. 15, 2025

(54) RF SIGNAL TRANSMISSION DEVICE FOR BASE STATION ANTENNA, PHASE SHIFTER AND BASE STATION ANTENNA

(71) Applicant: Outdoor Wireless Networks LLC, Claremont, NC (US)

(72) Inventors: Xun Zhang, Suzhou (CN); Zhigang Wang, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 347 days.

(21) Appl. No.: 17/785,486

(22) PCT Filed: Jan. 6, 2021

(86) PCT No.: PCT/US2021/012229
§ 371 (c)(1),
(2) Date: Jun. 15, 2022

(87) PCT Pub. No.: WO2021/150368
PCT Pub. Date: Jul. 29, 2021

(65) Prior Publication Data

US 2023/0013349 A1 Jan. 19, 2023

(30) Foreign Application Priority Data

Jan. 23, 2020 (CN) ......................... 202010077412.0

(51) Int. Cl.
*H01P 1/18* (2006.01)
*H01P 1/30* (2006.01)
(Continued)

(52) U.S. Cl.
CPC ................ *H01P 1/184* (2013.01); *H01P 1/30* (2013.01); *H01P 5/12* (2013.01); *H01Q 1/002* (2013.01);
(Continued)

(58) Field of Classification Search
CPC ......... H03H 1/0007; H01P 1/30; H01P 1/184; H01P 1/18
(Continued)

(56) References Cited

U.S. PATENT DOCUMENTS

| | | | |
|---|---|---|---|
| 6,285,336 | B1 | 9/2001 | Zimmerman |
| 11,450,956 | B2 | 9/2022 | Jang |

(Continued)

OTHER PUBLICATIONS

International Search Report and the Written Opinion of the International Searching Authority corresponding to International Patent Application No. PCT/US2021/012229 (13 pages) (mailed Mar. 23, 2021).

*Primary Examiner* — Rakesh B Patel
(74) *Attorney, Agent, or Firm* — Myers Bigel, P.A.

(57) ABSTRACT

RF signal transmission devices for a base station antenna include a printed circuit board which has a dielectric layer, a metal pattern layer on a first main surface of the dielectric layer, and a ground layer on a second main surface of the dielectric layer. The metal pattern layer has a transmission line deformation section for enhancing the ability to withstand surge current, and the ground layer comprises a groove that is configured to at least partially compensate for the change in the characteristic impedance due to the transmission line deformation section. The RF signal transmission device can achieve good characteristic impedance matching whilst enhancing the capacity to withstand surge current. In addition, the RF signal transmission device can improve PIM performance. The present disclosure also includes a phase shifter for a base station antenna and a base station antenna.

21 Claims, 4 Drawing Sheets

(51) Int. Cl.

| | |
|---|---|
| ***H01P 5/12*** | (2006.01) |
| ***H01Q 1/00*** | (2006.01) |
| ***H01Q 3/32*** | (2006.01) |
| ***H01Q 5/335*** | (2015.01) |
| *H01Q 1/24* | (2006.01) |

(52) U.S. Cl.
CPC ............... *H01Q 3/32* (2013.01); *H01Q 5/335* (2015.01); *H01Q 1/246* (2013.01)

(58) Field of Classification Search
USPC ................................. 333/138–144, 175, 181
See application file for complete search history.

(56) References Cited

U.S. PATENT DOCUMENTS

| | | | | |
|---|---|---|---|---|
| 2003/0147188 | A1* | 8/2003 | Hisaka | H01L 27/0266 361/56 |
| 2008/0143623 | A1 | 6/2008 | Pintos et al. | |
| 2013/0076453 | A1 | 3/2013 | Lai et al. | |
| 2020/0006848 | A1 | 1/2020 | Ding et al. | |

* cited by examiner

RF SIGNAL TRANSMISSION DEVICE FOR BASE STATION ANTENNA, PHASE SHIFTER AND BASE STATION ANTENNA

RELATED APPLICATIONS

This patent application claims priority to and the benefit of Chinese Patent Application Serial Number 202010077412.0 filed Jan. 23, 2020, the content of which is hereby incorporated by reference as if recited in full herein.

FIELD

The present disclosure generally relates to radio communications. More specifically, the present disclosure relates to an RF signal transmission device for a base station antenna, a phase shifter and a base station antenna.

BACKGROUND

In a mobile communication network, the feed network of a base station antenna is vulnerable to damage by a "surge current". A surge current, which refers to a transient current and voltage fluctuation, may damage circuits in the antenna. A surge current may be generated, for example, by a lightning strike, a fault in the power system (such as operation of circuit breaker, a short circuit fault, load input and cut, etc.), electrostatic discharge and the like. Therefore, it is a technical problem urgently needed to be solved to provide sufficient protection from a "surge current" for the base station antenna.

SUMMARY

One of the objects of the present disclosure is to provide an RF signal transmission device, a phase shifter and a base station antenna that overcome at least one of the defects in the prior art.

The present disclosure relates to an RF signal transmission device for a base station antenna comprising a printed circuit board which comprises a dielectric layer, a metal pattern layer on a first main surface of the dielectric layer, and a ground layer on a second main surface of the dielectric layer. The RF signal transmission device is configured with the metal pattern layer including a transmission line deformation section for enhancing the ability to withstand surge current and the ground layer including a groove that is configured to at least partially compensate for the change in the characteristic impedance due to the transmission line deformation section.

In some embodiments, the transmission line deformation section can be configured as a widened transmission line section.

In some embodiments, the transmission line deformation section can have an input section and/or an output section for an RF signal.

In some embodiments, the groove can at least partially overlap the transmission line deformation section in a direction perpendicular to a major surface of the printed circuit board.

In some embodiments, the groove can extend along the transmission line deformation section.

In some embodiments, the groove can extend substantially along the entire length of the transmission line deformation section.

In some embodiments, the shape of the groove can be rectangular or circular.

In some embodiments, the metal pattern layer can have a power divider that includes a first input section, a first output section and a second output section. The first input section, the first output section, and the second output section of the power divider can be configured as respective transmission line deformation sections.

In some embodiments, the ground layer can have a first groove that is associated with the first input section, a second groove that is associated with the first output section, and a third groove that is associated with the second output section.

In some embodiments, the first groove, the second groove, and the third groove can be spaced apart from each other.

In some embodiments, the first groove can extend along the first input section and at least partially overlaps the first input section in a direction perpendicular to a major surface of the printed circuit board; the second groove can extend along the first output section and at least partially overlaps the first output section in a direction perpendicular to the major surface of the printed circuit board; and the third groove can extend along the second output section and at least partially overlaps the second output section in a direction perpendicular to the major surface of the printed circuit board.

In some embodiments, the RF signal transmission device can be capable of withstanding surge current intensity of at least 10 kA.

In some embodiments, the RF signal transmission device can include be a phase shifter, a filter, a multiplexer, or a duplexer.

The present disclosure also relate to a phase shifter for a base station antenna. The phase shifter includes a first printed circuit board and a movable member. The first printed circuit board includes a dielectric layer, a metal pattern layer on a first main surface of the dielectric layer and a ground layer on a second main surface of the dielectric layer. The metal pattern layer has an input section that is connected to an RF input port and at least one output section that is connected to at least one respective RF output port. The movable member can be configured to adjust phases of at least some RF sub-components of an RF signal that is input at the RF input port. The input section is configured as a transmission line deformation section for enhancing the ability to withstand surge current. The ground layer includes a groove that is associated with the transmission line deformation section. The groove can be configured to at least partially compensate for the change in the characteristic impedance due to the transmission line deformation section.

In some embodiments, the transmission line deformation section can be configured as a widened transmission line section.

In some embodiments, the groove can at least partially overlap the transmission line deformation section in a direction perpendicular to a major surface of the first printed circuit board.

In some embodiments, the groove can extend along the transmission line deformation section.

In some embodiments, the groove can extend substantially along the entire trajectory of the transmission line deformation section.

In some embodiments, the first output section in the metal pattern layer can be configured as a second transmission line deformation section. The first output section can transmit a sub-component of the RF signal to an output port without an adjustable phase shift.

In some embodiments, the ground layer has a first groove that is associated with the input section and a second groove that is associated with the first output section. The first groove and the second groove can be configured to at least partially compensate for changes in the characteristic impedance due to the transmission line deformation section and the second transmission line deformation section, respectively.

In some embodiments, the first groove and the second groove can be spaced apart from each other.

In some embodiments, the first groove can extend along the input section and at least partially overlaps the input section in a direction perpendicular to a major surface of the printed circuit board; and the second groove can extend along the first output section and at least partially overlaps the first output section in a direction perpendicular to the major surface of the printed circuit board.

In some embodiments, a second output section in the metal pattern layer is configured as a third transmission line deformation section. The second output section can transmit a sub-component of the RF signal to an output port that experiences an adjustable phase shift.

In some embodiments, the phase shifter can be capable of withstanding surge current intensity of at least 10 kA.

In some embodiments, the movable member can be configured as a wiping member rotatable above the metal pattern layer for adjusting the phase shift experienced by the RF signal that travels between the input port and a corresponding output port.

In some embodiments, the phase shifter can be configured as a wiping phase shifter, a trombone type phase shifter, or a sliding dielectric phase shifter.

The present disclosure also relates to a base station antenna. The base station antenna includes an RF signal transmission device and/or the base station antenna comprises a phase shifter as stated above.

The present disclosure also relates to an RF signal transmission device for a base station antenna that includes a printed circuit board that includes a dielectric layer, a metal pattern layer on a first main surface of the dielectric layer, and a ground layer on a second main surface of the dielectric layer. The metal pattern layer includes a widened transmission line section that is wider than at least one other transmission line section on the printed circuit board, and the ground layer includes a groove in which the metallization is removed underneath the widened transmission line section.

In some embodiments, the RF signal transmission device is a power divider, and the widened transmission line section is along an input section of the power divider.

In some embodiments, the groove extends substantially along a length of the widened transmission line section.

Other features and advantages of the subject art of the present disclosure will be formulated in the following descriptions, and will be partially obvious from said descriptions, or may be learned by practicing the subject art of the present disclosure. Advantages of the subject art of the present disclosure will be realized and attained by the structure particularly set forth in the written description as well as its claims and drawings.

It should be understood that the aforementioned general descriptions and the following detailed descriptions are all exemplary and descriptive, and intended to provide further illustrations of the subject art of the present disclosure for which protection is sought.

BRIEF DESCRIPTION OF THE DRAWINGS

After reading the embodiments hereinafter in conjunction with the accompanying drawings, aspects of the present invention will be better understood. In the accompanying drawings.

DETAILED DESCRIPTION

Figure 1:
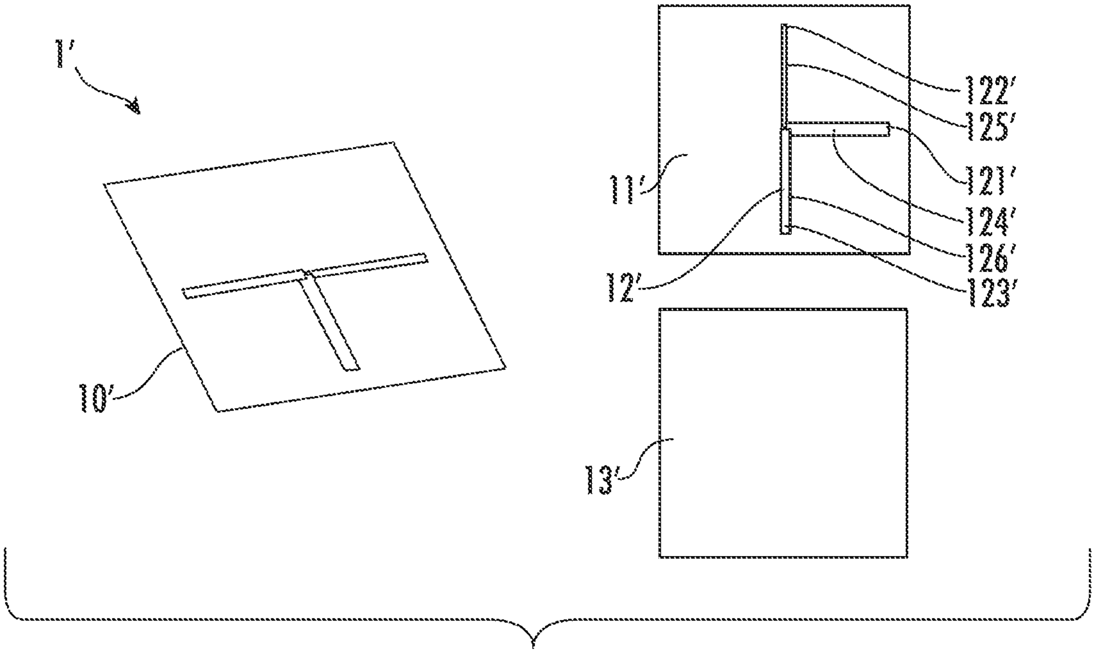
FIG. 1 is a schematic view of a microstrip line power divider.

The present disclosure will be described below with reference to the drawings, in which several embodiments of the present disclosure are shown. It should be understood, however, that the present disclosure may be presented in multiple different ways, and not limited to the embodiments described below. In fact, the embodiments described hereinafter are intended to make a more complete disclosure of the present disclosure and to adequately explain the protection scope of the present disclosure to a person skilled in the art. It should also be understood that the embodiments disclosed herein can be combined in various ways to provide more additional embodiments.

It should be understood that, in the drawings, the same reference numbers indicate the same elements. In the drawings, for the sake of clarity, the sizes of certain features may be exaggerated.

It should be understood that the wording in the specification is only used for describing particular embodiments and is not intended to define the present disclosure. All the terms used in the specification (including the technical terms and scientific terms), have the meanings as normally understood by a person skilled in the art, unless otherwise defined. For the sake of conciseness and/or clarity, the well-known functions or constructions may not be described in detail any further.

The singular forms “a/an”, “said” and “the” as used in the specification, unless clearly indicated, all contain the plural forms as well. The wordings “comprising”, “containing” and “including” used in the specification indicate the presence of the claimed features, but do not repel the presence of one or more other features. The wording “and/or” as used in the specification includes any and all combinations of one or more of the relevant items listed. The phrases “between X and Y” and “between around X and Y” as used in the specification should be construed as including X and Y. The phrase “between about X and Y” as used in the present specification means “between about X and about Y”, and the phrase “from about X to Y” as used in the present specification means “from about X to about Y”.

In the specification, when one element is referred to as being “on” another element, “attached to” another element, "connected to" another element, "coupled to" another element, or "in contact with" another element, the element may be directly located on another element, attached to another element, connected to another element, coupled to another element, or in contact with another element, or there may be an intermediate element. By contrast, when one element is referred to as being "directly" on another element, "directly attached to" another element, "directly connected to" another element, "directly coupled to" another element, or "in direct contact with" another element, there will not be an intermediate element. In the specification, when one feature is arranged to be "adjacent" to another feature, it may mean that one feature has a portion that overlaps with an adjacent feature or a portion that is located above or below an adjacent feature.

In the specification, the spatial relation wordings such as "up", "down", "left", "right", "forth", "back", "high", "low" and the like may describe a relation of one feature with another feature in the drawings. It should be understood that, the spatial relation wordings also contain different orientations of the apparatus in use or operation, in addition to containing the orientations shown in the drawings. For example, when the apparatus in the drawings is overturned, the features previously described as "below" other features may be described to be "above" other features at this time. The apparatus may also be otherwise oriented (rotated 90 degrees or at other orientations). At this time, the relative spatial relations will be explained correspondingly.

Printed circuit board (PCB) microstrip lines are widely used as transmission lines in feed networks for base station antennas. The feed network is an important part of the base station antenna and is used to connect the antenna ports to the arrays of radiating elements. A feed network includes a plurality of RF signal transmission paths and implements functions such as characteristic impedance matching. The feed network, which is closely related to the radiation performance of the antenna, directly affects parameters such as the standing wave ratio, the radiation efficiency, and the beam pointing direction of an antenna array. In the design of a feed network for a base station antenna, attention is paid to characteristics of the feed network such as impedance matching and amplitude-phase distribution to reduce RF signal loss, improve radiation efficiency, and obtain favorable antenna pattern characteristics.

The characteristic impedance is an important parameter in a wireless communication system. During signal transmission, if there is a change in the characteristic impedance along an RF transmission path, the RF signal will be reflected at the location of the impedance discontinuity. This reflection forms a standing wave on the transmission path, which leads to lost power in the form of reflected power. Therefore, it is desirable to achieve a favorable matching of the characteristic impedance during RF signal transmission.

A microstrip transmission line, or "microstrip line," includes a conductive signal trace that runs above a conductive ground plane layer. A dielectric material (e.g., a PCB substrate, air, etc.) separates the conductive signal trace from the conductive ground plane. The characteristic impedance of such a microstrip line is mainly determined by the width and thickness of the transmission line, as well as a thickness and permittivity of the dielectric material. With respect to feed networks for base station antennas, the conductive signal traces of the microstrip transmission lines used in the feed networks are often designed to be thin in order to reduce the size and the cost of the feed network. Unfortunately, thin microstrip transmission lines typically have a decreased ability to withstand surge current. For example, a thin PCB-based microstrip transmission line may not be able to withstand surge currents that are larger than 3 kA. In order to improve the overall stability and safety of the system, it can be desirable that the feed network be able to withstand larger surge currents.

Various embodiments of the present invention relate to a microstrip line-based RF signal transmission devices that are suitable for use in a feed network of a base station antenna. These microstrip line-based RF signal transmission devices may comprise a printed circuit board that includes a dielectric layer, a metal pattern layer on a first main surface of the dielectric layer and a ground layer on a second main surface of the dielectric layer, where the metal pattern layer comprises an RF signal transmission path. In some embodiments, the RF signal transmission device may be a power divider, a phase shifter, a duplexer, a multiplexer, or a filter in a feed network of a base station antenna.

FIG. 1 shows one embodiment of an RF signal transmission device in the form of a microstrip-line-based power divider 1'. In a base station antenna system, the microstrip line power divider 1' may be configured to divide each RF signal input thereto into a plurality of RF sub-components according to a predetermined power allocation rule, and to transmit the RF sub-components to respective downstream RF elements. As shown in FIG. 1, the microstrip line power divider 1' may include a printed circuit board 10' that includes a dielectric layer 11', a metal pattern layer 12' on a first main surface of the dielectric layer 11' and a ground layer 13' on a second main surface of the dielectric layer 11'. The left side of FIG. 1 is a schematic perspective view of the microstrip line power divider 1', and the right side of FIG. 1 is a schematic view in which the ground layer 13' is separated from the dielectric layer 11' and the metal pattern layer 12'. The metal pattern layer 12' may include an input port 121', a first output port 122', and a second output port 123', as well as an input section 124', a first output section 125', and a second output section 126' that extend between the input port 121' and the respective output ports 122', 123'. The input section 124', the first output section 125', and the second output section 126' may form a substantially T-shape. The input port 121' may connect to an RF signal input of the base station antenna or to an output port of an upstream power divider and may feed a first sub-component of the RF signal to the first output port 122' via the input section 124' and the first output section 125'. The first output port 122' may feed the first sub-component of the RF signal to a downstream RF element of the base station antenna or to the input port of a downstream power divider. Similarly, the input port 121' feeds a second sub-component of the RF signal to the second output port 123' via the input section 124' and the second output section 126'. Thus, the second output port 123' may feed the second sub-component of the RF signal to a downstream RF element of the base station antenna or to the input port of a downstream power divider. The first sub-component and the second sub-component of the RF signal may be allocated with corresponding quotas of power according to the design of the power divider, such as, for example, the respective widths of the input section 124', the first output section 125', and the second output section 126'.

In the example shown in FIG. 1, the metal pattern layer 12' comprises an input section 124', a first output section 125', and a second output section 126'. It should be understood that more than two output sections may be provided. In other embodiments, the metal pattern layer 12' may include a plurality of power dividers connected in parallel and/or in series.

Figure 2:
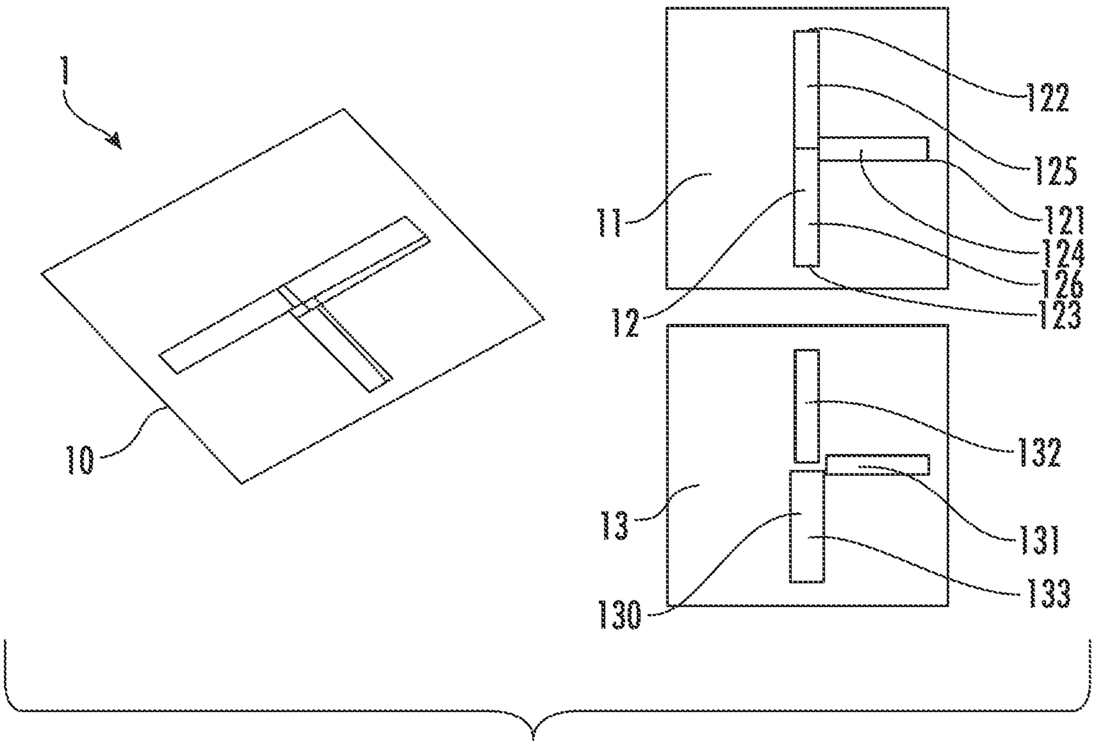
FIG. 2 is a schematic view of a microstrip line power divider according to embodiments of the present invention.

FIG. 2 shows a microstrip line-based power divider 1 according to one embodiment of the invention. Similar to FIG. 1, the left side of FIG. 2 is a schematic perspective view of the microstrip line-based power divider 1, while the right side of FIG. 2 is a schematic view in which the ground layer 13 is separated from the dielectric layer 11 and the metal pattern layer 12. In order to enhance the ability to withstand surge current, the metal pattern layer 12 of the power divider in FIG. 2 may include at least one transmission line deformation section.

In some embodiments, the transmission line deformation section may mainly be located at a section where the power in the RF signal transmission path converge, such as an input section of an RF signal in the power divider.

In some embodiments, the transmission line deformation section may be configured as a widened transmission line section, for example, the width of the transmission line is widened to 2 times, 3 times, 4 times, or 5 times more than normal in order to enhance its ability to withstand a surge current. In some embodiments, the average width of the input section and each output transmission line of the microstrip line power divider 1 according to one embodiment of the present invention is at least five times that of a conventional design. Correspondingly, with respect to a maximum surge current intensity of 3 kA that the conventional microstrip line power divider 1' is able to withstand, the microstrip line power divider 1 according to the embodiment of FIG. 2 can withstand surge current intensity of at least 10 kA, or higher than 10 kA. In other embodiments, in order to enhance the ability to withstand surge current, it is also possible to thicken the metallization of a corresponding transmission line section (e.g., the input section 124), or change the thickness or permittivity of the dielectric material.

As shown in FIG. 2, the transmission line deformation section in the metal pattern layer 12 in this embodiment may include an input section 124, a first output section 125, and a second output section 126. The widths of the conductive traces of the input section 124, the first output section 125, and the second output section 126 are greater than the widths of the corresponding conductive traces in the transmission lines of FIG. 1. Here, an average width of the transmission line may be considered when referring to its width. In some embodiments, the average width of the widened input section 124 and output transmission sections 125, 126 is at least twice, three times, four times or five times the average width of the input section 124' and the output transmission sections 125', 126' in FIG. 1. By increasing the width of the transmission line, the overall stability of the power divider 1 is improved, so that the power divider 1 can withstand larger surge currents.

However, the deformation (here a widening) that is present in the transmission line deformation section changes the characteristic impedance of the transmission line deformation section (for example, the characteristic impedance may be reduced), thereby affecting the impedance matching of the feed network, and increasing the return loss, which results in a reduced transmission efficiency for the RF signals. In order to mitigate this effect, the ground layer 13 may include a groove 130 that is associated with a corresponding transmission line deformation section. The groove 130 comprises a region where the metallization is removed from the ground plane layer. The groove 130 is configured to adjust the characteristic impedance on the RF signal transmission path so as to compensate for the change in the characteristic impedance due to the transmission line deformation section. In some embodiments, the groove 130 at least partially overlaps its associated transmission line deformation section in a direction perpendicular to a major surface of the printed circuit board 10. In some embodiments, the groove 130 extends along (below) its associated transmission line deformation section and may extend substantially along the entire length of its associated transmission line deformation section in some embodiments.

In order to achieve the characteristic impedance matching of the power divider while widening the transmission line, as shown in the lower right side of FIG. 2, three grooves, i.e., a first groove 131, a second groove 132 and a third groove 133, may be provided in the ground layer according to this embodiment.

In the embodiment of FIG. 2, the first groove 131 extends in the ground layer 13 along the input section 124, the second groove 132 extends in the ground layer 13 along the first output section 125, and the third groove 133 extends in the ground layer 13 along the second output section 126. In some embodiments, each groove may extend along the entire length of its associated transmission line. The grooves 131, 132, 133, which adjust the characteristic impedance, may make it easier to tune the RF performance of the antenna. For example, the S parameters (e.g. the reflection coefficient and/or the transmission coefficient) of the power divider may be adjusted by changing the size, shape and/or position of the first groove 131, the second groove 132 and/or the third groove 133. In addition, each groove extends along its associated transmission line so as to facilitate maintaining the consistency of the characteristic impedance along the transmission line, and further reducing the return loss.

The sizes, shapes, and positions of the three grooves 131, 132, 133 are designed to enable adjusting the characteristic impedance of the corresponding transmission lines so as to compensate for the change in the characteristic impedance incurred by widening these transmission lines. By appropriately providing the grooves in the ground layer 13, a desired impedance matching may be achieved, so that it is possible to achieve a favorable impedance matching whilst improving the performance to withstand surge current performance of the power divider 1.

It should be understood that, in other embodiments, the sizes, shapes, numbers, and positions of the grooves 130 in the ground layer 13 may be different from those shown in FIG. 2 according to actual needs. For example, in some embodiments, it is possible to provide only one groove 130 in the ground layer 13, where the groove 130 overlaps at least one of the transmission lines in a direction perpendicular to a major surface of the printed circuit board. For example, in some embodiments, the shape of the groove 130 may be rectangular, circular, obround, or the like. In some embodiments, the number of grooves 130 may be two, four, or more. In some embodiments, the number of the grooves 130 is the same as the sum of the number of transmission lines, and the grooves may at least partially overlap the respective transmission lines. In some embodiments, when the number of grooves 130 is more than one, the grooves 130 are spaced apart from each other.

The widths of the transmission lines in the metal pattern layer 12 of the microstrip line power divider 1 may be determined according to the ability to withstand surge current as required (for example, the ability to withstand surge current of 10 kA). Subsequently, the shapes, sizes, numbers, and positions of the grooves 130 in the ground layer 13 may be determined according to the overall characteristic impedance desired to be achieved by the microstrip line power divider 1. It should be understood that the combination of the shapes, sizes, numbers, and positions of the grooves 130 that can achieve the overall characteristic impedance as desired by the microstrip line power divider 1 is not unique.

In the field of RF communication, reflection loss (return loss) is an important criterion for evaluating the characteristic impedance matching. As described above, during transmission of an RF signal, the RF signal will be reflected at locations along the transmission path where the characteristic impedance is discontinuous. Therefore, it is possible to determine that a desired characteristic impedance has been achieved if a measurement result of the reflection loss is approximately the same as the reflection loss before changing the width of the transmission line of the metal pattern layer.

Figure 3:
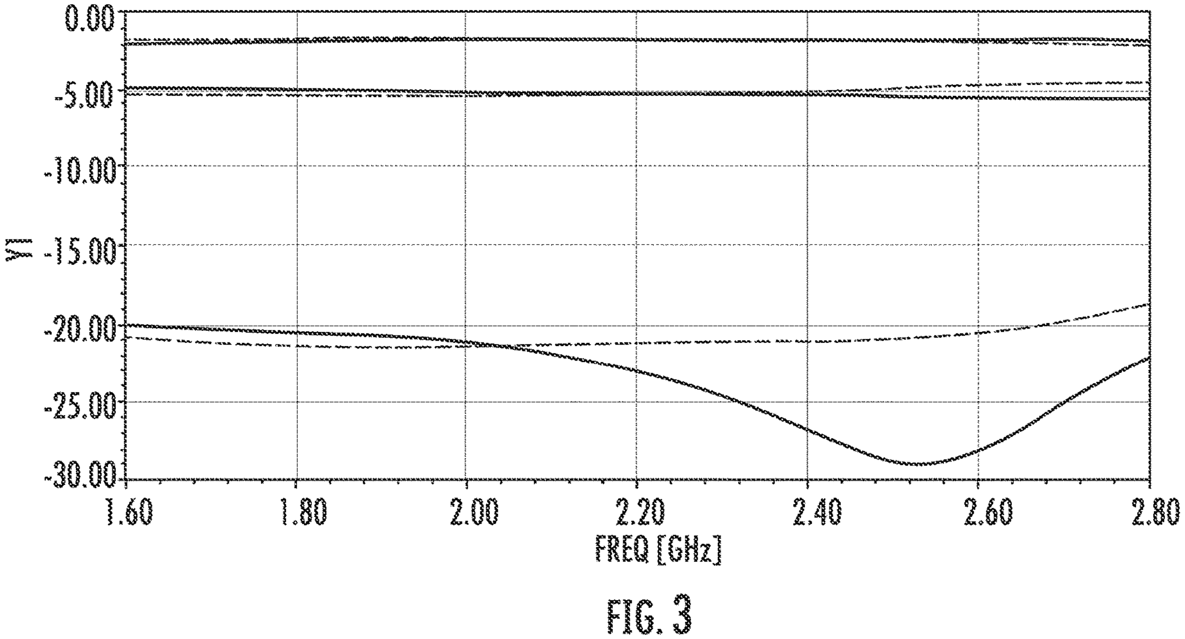
FIG. 3 is a graph comparing the performance of the microstrip line power divider of FIG. 1 and the microstrip line power divider of FIG. 2 in terms of their reflection and transmission coefficients (as generated based on simulation/modeling and/or experiment)

FIG. 3 is a graph comparing the microstrip line power divider in FIG. 1 and the microstrip line power divider in FIG. 2 in terms of their reflection and transmission coefficients. In FIG. 3, the dotted line corresponds to the performance of the microstrip line power divider 1' of FIG. 1, and the solid line corresponds to the performance of the microstrip line power divider 1 according to the embodiment of FIG. 2. As shown, the microstrip line power divider 1 according to the embodiment of FIG. 2 has a reflection coefficient that is substantially the same as that of the power divider 1' of FIG. 1, where the reflection coefficient at high frequency is even lower than that of the existing design. In addition, it may also be seen from FIG. 3 that the microstrip line power divider 1 according to the embodiment of FIG. 2 has a transmission coefficient that is substantially the same as that of the power divider 1' of FIG. 1, i.e., the modification to the microstrip line power divider does not appreciably affect the power allocation of the power divider.

Figure 4:
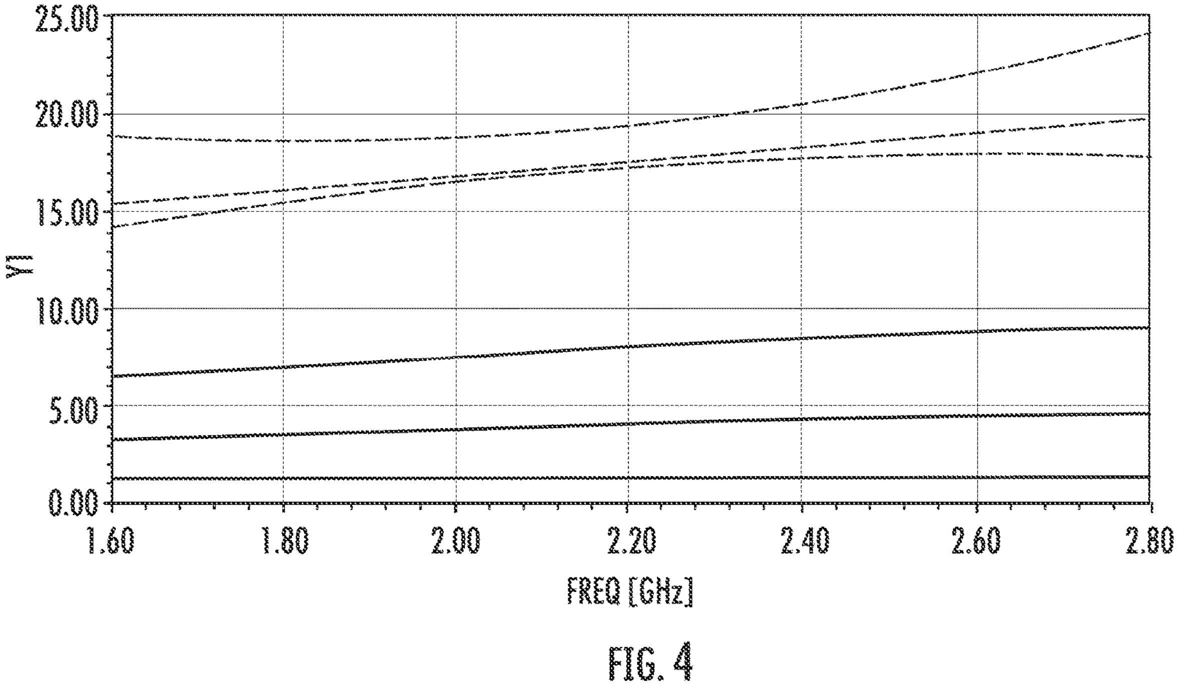
FIG. 4 is a graph comparing the performance of the microstrip line power divider of FIG. 1 and the microstrip line power divider of FIG. 2 in terms of their surface loss density (as generated based on simulation/modeling and/or experiment)

FIG. 4 is a graph comparing a surface loss density of the microstrip line power divider 1' of FIG. 1 and a surface loss density of the microstrip line power divider 1 according to the embodiment of FIG. 2. In FIG. 4, the dotted line corresponds to the performance of the microstrip line power divider 1' of FIG. 1, and the solid line corresponds to the performance of the microstrip line power divider 1 according to the embodiment of FIG. 2. As shown, the microstrip line power divider 1 according to the embodiment of FIG. 2, which has a widened transmission line, has lower surface loss density than the microstrip line power divider 1' of FIG. 1. Therefore, the widened transmission line may also improve the passive intermodulation (PIM) performance of the power divider.

Figure 5:
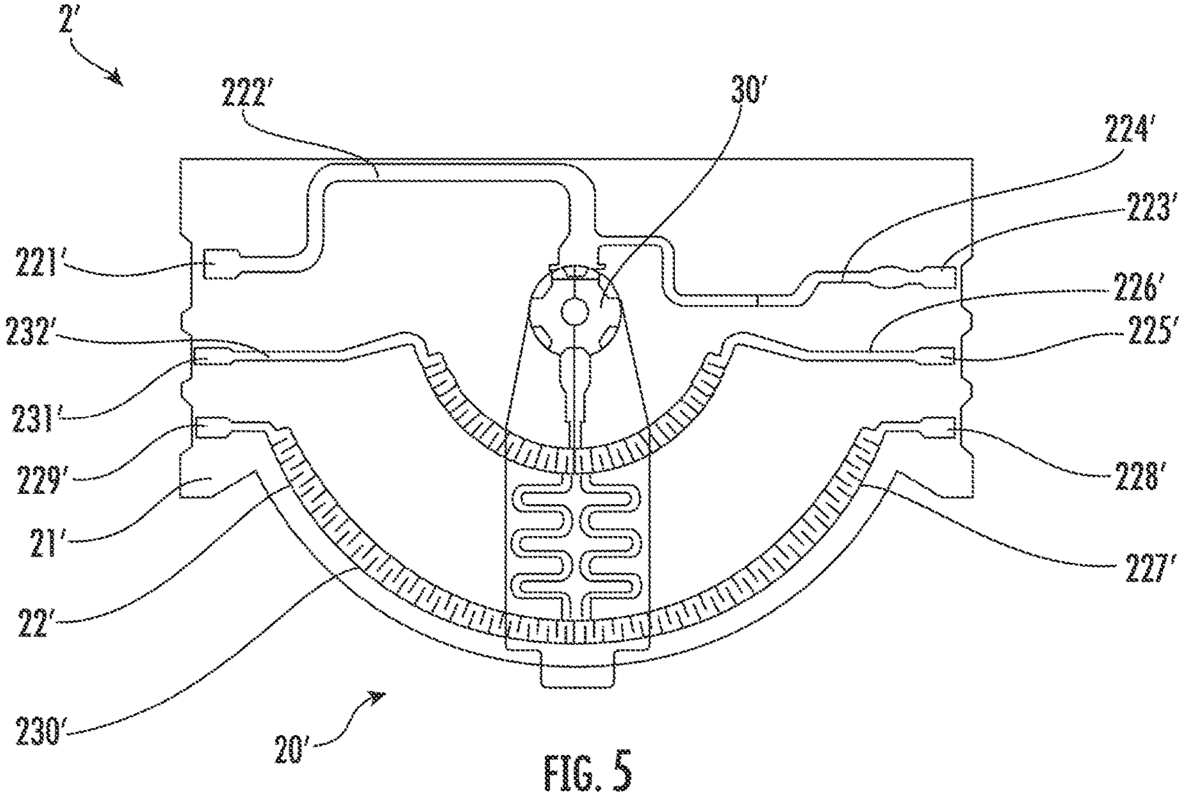
FIG. 5 is a schematic view of a phase shifter.

FIG. 5 is a plan view of an RF signal transmission device according to the present invention, where the RF signal transmission device is a phase shifter for a base station antenna. The phase shifter, which can be used to adjust the antenna pattern generated by an array of radiating elements (e.g., it can be used to adjust the downward tilt angle of the antenna beam).

The phase shifter according to various embodiments of the present invention may be configured as various types of phase shifters, for example, it may be a wiping type phase shifter, a trombone type phase shifter, or a sliding dielectric phase shifter.

Figure 6:
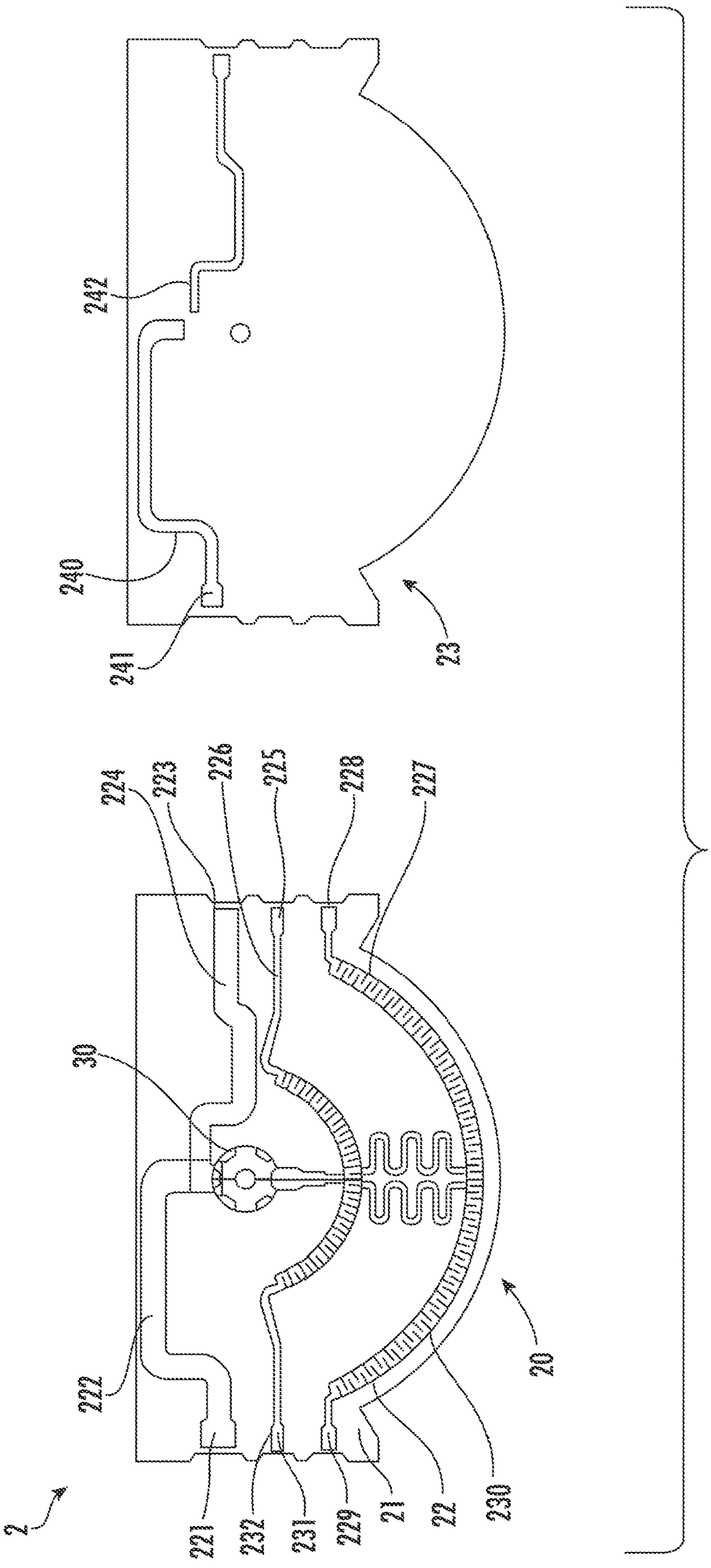
FIG. 6 is a schematic view of a phase shifter according to embodiments of the present invention.

Next, a phase shifter according to some embodiments of the present invention will be exemplarily introduced by FIGS. 5 and 6. FIG. 5 shows a widely used electromechanical "wiping" type phase shifter 2', which comprises a first printed circuit board 20' and a movable member 30'. The first printed circuit board 20' comprises a dielectric layer 21', a metal pattern layer 22' on a first main surface of the dielectric layer 21', and a ground layer (not shown in FIG. 5) on a second main surface of the dielectric layer 21', where the metal pattern layer 22' comprises an input section 222' connected to the input port 221' and a first output section 224' connected to the first output port 223', a second output section 226' connected to the second output port 225', a third output section 228' connected to the third output port 227', a fourth output section 230' connected to the fourth output port 229' and a fifth output section 232' connected to a fifth output port 231'. The movable member 30' is configured as a wiping member that is rotatable above the metal pattern layer 22'. The phase shifter may divide an RF signal input thereto into a plurality of RF sub-components and may adjust the relative phases of the RF sub-components in order to adjust the antenna pattern. It should be understood that, in other embodiments, the metal pattern layer 22' may include any appropriate number of input sections and any appropriate number of output sections. It should also be understood that, in other embodiments, the movable member 30' may be configured in other known forms to adjust the phase shifts that are applied to the RF sub-components.

The wiping phase shifter 2' is configured to pass at least one sub-component of the input RF signal received at the metal pattern layer 22' to the wiping member 30'. The RF sub-component(s) passed to the wiping member 30' may be further sub-divided on the wiping member, and the RF sub-components are coupled back to the metal pattern layer 22' from the wiping member 30' along multiple arc-shaped phase-shift transmission lines. The end of each phase-shift transmission line may be connected to a respective radiating element or to a respective group of radiating elements. By physically (mechanically) rotating the wiping member 30' over the metal pattern layer 22', it is possible to change the position where the RF sub-components are coupled back to the metal pattern layer 22', and to accordingly change the length of the corresponding transmission paths through the phase shifter 2'. Such change in the oath lengths results in changes in the phase of the corresponding RF sub-components.

The metal pattern layer 22' may include a transmission line deformation section for enhancing the ability to withstand surge current. For example, the transmission line section in the metal pattern layer 22' that passes the largest amount of signal power may be configured as the transmission line deformation section. For example, in the embodiment of FIG. 6, when other elements correspond to corresponding elements in FIG. 5, the input section 222 and the first output section 224 of the metal pattern layer 22 may be configured as transmission line deformation sections, such as widened sections. It should be understood that, in FIG. 6, the elements that are the same as or similar to those in FIG. 5 are denoted by the reference signs in FIG. 5 from which the apostrophe is removed. In some embodiments, the first output section 224 transmits the corresponding RF sub-components to a corresponding output port without an adjustable phase shift. By widening some of the transmission lines, the overall safety of the phase shifter 2 is improved, so that the phase shifter 2 can withstand greater surge current. It should be understood that, in other embodiments, other signal transmission line sections in the metal pattern layer 22 may also be configured as transmission line deformation sections.

In order to achieve the characteristic impedance matching of the phase shifter 2 while employing widened transmission lines, the ground layer 23 as shown in FIG. 6 may include a respective groove 240 that is associated with each transmission line deformation section, where the groove 240 is configured to compensate for the change in the impedance due to the respective transmission line deformation section.

In some embodiments, each groove 240 may overlap its associated transmission line deformation section in a direction perpendicular to a major surface of the first printed circuit board 20. In some embodiments, the groove 240 extends along its associated transmission line deformation section and may extend substantially along the entire length of its associated transmission line deformation section.

As shown on the right side of FIG. 6, in this embodiment, the ground layer 23 comprises a first groove 241 which is associated with the input section 222 and a second groove 242 which is associated with the first output section 224. The first groove 241 and the second groove 242 are configured to compensate for the changes in the characteristic impedance caused by the respective transmission line deformation sections, while maintaining favorable performance in transmission and distribution of the RF signal. Similarly, the widened transmission line allows the phase shifter 2 to have improved PIM performance. In other embodiments, in order to enhance the ability to withstand surge current, the corresponding transmission lines may also be thickened. The first groove 241 and the second groove 242 extend along their associated transmission line deformation sections, and the first groove 241 and the second groove 242 are spaced apart from each other.

In some embodiments, only the input section 222 and/or the first output section 224 are/is configured as a widened transmission lines, so that a favorable performance to withstand surge current can be obtained in the input transmission section and the output transmission section, which are the sections that typically carry relatively greater power. In other embodiments, other input and/or output transmission sections may also be configured as widened transmission lines.

The RF signal transmission device according to the present invention has a simple configuration and manufacturing process and can achieve good characteristic impedance matching whilst enhancing the capacity to withstand surge current. In addition, the RF signal transmission device according to the present invention also has the advantage of improved PIM performance. It should be understood that the RF signal transmission device according to the present invention may also be applied to RF signal transmission devices such as a filter and a duplexer in addition to a power divider and a phase shifter.

Although the exemplary embodiments of the present disclosure have been described, a person skilled in the art should understand that, he or she can make multiple changes and modifications to the exemplary embodiments of the present disclosure without substantively departing from the spirit and scope of the present disclosure. Accordingly, all the changes and modifications are encompassed within the protection scope of the present disclosure as defined by the claims. The present disclosure is defined by the appended claims, and the equivalents of these claims are also contained therein.

What is claimed is:

1. An RF signal transmission device for a base station antenna, comprising:

a printed circuit board comprising a dielectric layer, a metal pattern layer on a first main surface of the dielectric layer, and a ground layer on a second main surface of the dielectric layer, wherein the metal pattern layer comprises a transmission line with a transmission line deformation section configured to enhance an ability to withstand surge current, wherein the transmission line comprises a length dimension, wherein the transmission line deformation section is continuous with a constant width along the length dimension, and wherein the ground layer comprises a groove that is configured to at least partially compensate for a change in a characteristic impedance due to the transmission line deformation section.

2. The RF signal transmission device according to claim 1, wherein the transmission line deformation section is configured as a widened transmission line section.

3. The RF signal transmission device according to claim 1, wherein the transmission line deformation section comprises an input section and/or an output section for an RF signal.

4. The RF signal transmission device according to claim 1, wherein the groove at least partially overlaps the transmission line deformation section in a direction perpendicular to a major surface of the printed circuit board, and wherein the groove extends substantially along an entire length of the transmission line deformation section.

5. The RF signal transmission device according to claim 1, wherein the RF signal transmission device is capable of withstanding surge current intensity of at least 10 kA, and wherein the RF signal transmission device is a phase shifter, a filter, a multiplexer, or a duplexer.

6. The RF signal transmission device according to claim 1, wherein the groove has a shape that is rectangular or circular.

7. An RF signal transmission device for a base station antenna, comprising:

a printed circuit board comprising a dielectric layer, a metal pattern layer on a first main surface of the dielectric layer, and a ground layer on a second main surface of the dielectric layer, wherein the metal pattern layer comprises a transmission line deformation section configured to enhance an ability to withstand surge current, and wherein the ground layer comprises a groove that is configured to at least partially compensate for a change in a characteristic impedance due to the transmission line deformation section, wherein the metal pattern layer comprises a power divider that includes a first input section, a first output section and a second output section, wherein the first input section, the first output section, and the second output section of the power divider are configured as respective transmission line deformation sections.

8. The RF signal transmission device according to claim 7, wherein the ground layer comprises a first groove that is associated with the first input section, a second groove that is associated with the first output section, and a third groove that is associated with the second output section.

9. The RF signal transmission device according to claim 8, wherein:

the first groove extends along the first input section and at least partially overlaps the first input section in a direction perpendicular to a major surface of the printed circuit board;

the second groove extends along the first output section and at least partially overlaps the first output section in a direction perpendicular to the major surface of the printed circuit board; and the third groove extends along the second output section and at least partially overlaps the second output section in a direction perpendicular to the major surface of the printed circuit board.

10. The RF signal transmission device according to claim 8, wherein the first groove, the second groove, and the third groove are spaced apart from each other.

11. A phase shifter for a base station antenna, wherein the phase shifter comprises a first printed circuit board and a movable member, wherein the first printed circuit board comprises a dielectric layer, a metal pattern layer on a first main surface of the dielectric layer and a ground layer on a second main surface of the dielectric layer, wherein the metal pattern layer comprises an input section that is connected to an RF input port and at least one output section that is connected to at least one respective RF output port, wherein the movable member is configured to adjust phases of at least one RF sub-component of an RF signal that is input at the RF input port, wherein the input section is configured as a transmission line deformation section for enhancing the ability to withstand surge current, and the ground layer includes a groove that is associated with the transmission line deformation section, and wherein the groove is configured to at least partially compensate for a change in characteristic impedance due to the transmission line deformation section, wherein the movable member is configured as a wiping member rotatable above the metal pattern layer for adjusting the phase shift experienced by the RF signal that travels between the input port and a corresponding output port, and wherein the phase shifter is capable of withstanding surge current intensity of at least 10 kA.

12. The phase shifter according to claim 11, wherein the transmission line deformation section is configured as a widened transmission line section.

13. The phase shifter according to claim 11, wherein the groove at least partially overlaps the transmission line deformation section in a direction perpendicular to a major surface of the first printed circuit board.

14. The phase shifter according to claim 11, wherein the groove extends along the transmission line deformation section.

15. The phase shifter according to claim 11, wherein the phase shifter is configured as a wiping phase shifter, a trombone type phase shifter, or a sliding dielectric phase shifter.

16. A phase shifter for a base station antenna, wherein the phase shifter comprises a first printed circuit board and a movable member, wherein the first printed circuit board comprises a dielectric layer, a metal pattern layer on a first main surface of the dielectric layer and a ground layer on a second main surface of the dielectric layer, wherein the metal pattern layer comprises an input section that is connected to an RF input port and at least one output section that is connected to at least one respective RF output port, wherein the movable member is configured to adjust phases of at least one RF sub-component of an RF signal that is input at the RF input port, wherein the input section is configured as a transmission line deformation section for enhancing the ability to withstand surge current, and the ground layer includes a groove that is associated with the transmission line deformation section, and wherein the groove is configured to at least partially compensate for a change in characteristic impedance due to the transmission line deformation section, wherein the first output section in the metal pattern layer is configured as a second transmission line deformation section, wherein the first output section transmits a sub-component of the RF signal to an output port without an adjustable phase shift.

17. The phase shifter according to claim 16, wherein the ground layer comprises a first groove that is associated with the input section and a second groove that is associated with the first output section, and wherein the first groove and the second groove are configured to at least partially compensate for changes in the characteristic impedance due to the transmission line deformation section and the second transmission line deformation section, respectively.

18. The phase shifter according to claim 16, wherein:

the first groove extends along the input section and at least partially overlaps the input section in a direction perpendicular to a major surface of the printed circuit board; and the second groove extends along the first output section and at least partially overlaps the first output section in a direction perpendicular to the major surface of the printed circuit board.

19. The phase shifter according to claim 16, wherein a second output section in the metal pattern layer is configured as a third transmission line deformation section, and wherein the second output section transmits a sub-component of the RF signal to an output port that experiences an adjustable phase shift.

20. An RF signal transmission device for a base station antenna, comprising:

a printed circuit board that includes a dielectric layer, a metal pattern layer on a first main surface of the dielectric layer, and a ground layer on a second main surface of the dielectric layer, wherein the metal pattern layer includes a widened transmission line section that is wider than at least one other transmission line section on the printed circuit board, and the ground layer includes a groove in which metallization is removed underneath the widened transmission line section, wherein the RF signal transmission device is a power divider, and the widened transmission line section is along an input section of the power divider.

21. The RF signal transmission device according to claim 20, wherein the groove extends substantially along a length of the widened transmission line section.

* * * * *